United States Patent
Laas et al.

(10) Patent No.: US 10,179,830 B2
(45) Date of Patent: Jan. 15, 2019

(54) THIOALLOPHANATE POLYISOCYANATES CONTAINING SILANE GROUPS

(71) Applicant: Covestro Deutschland AG, Leverkusen (DE)

(72) Inventors: Hans-Josef Laas, Odenthal (DE); Christoph Eggert, Köln (DE); Dieter Mager, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 26 days.

(21) Appl. No.: 15/317,215

(22) PCT Filed: Jun. 9, 2015

(86) PCT No.: PCT/EP2015/062758
§ 371 (c)(1),
(2) Date: Dec. 8, 2016

(87) PCT Pub. No.: WO2015/189164
PCT Pub. Date: Dec. 17, 2015

(65) Prior Publication Data
US 2017/0121450 A1    May 4, 2017

(30) Foreign Application Priority Data
Jun. 13, 2014    (EP) .................................... 14172295

(51) Int. Cl.
C08G 18/78    (2006.01)
C08G 18/79    (2006.01)
C08G 18/80    (2006.01)
C08G 18/22    (2006.01)
C09D 175/04    (2006.01)
C08G 18/28    (2006.01)
C08G 18/73    (2006.01)
C08G 18/75    (2006.01)
C09D 175/12    (2006.01)

(52) U.S. Cl.
CPC ....... *C08G 18/7837* (2013.01); *C08G 18/222* (2013.01); *C08G 18/289* (2013.01); *C08G 18/73* (2013.01); *C08G 18/755* (2013.01); *C08G 18/7818* (2013.01); *C08G 18/792* (2013.01); *C08G 18/809* (2013.01); *C09D 175/04* (2013.01); *C09D 175/12* (2013.01)

(58) Field of Classification Search
CPC ............................. C08G 18/7837; C08K 5/548
See application file for complete search history.

(56) References Cited

U.S. PATENT DOCUMENTS

| 3,769,318 A | 10/1973 | Windemuth et al. |
| 3,996,223 A | 12/1976 | Gupta et al. |
| 4,160,080 A | 7/1979 | Köenig et al. |
| 4,255,569 A | 3/1981 | Müller et al. |
| 4,837,359 A | 6/1989 | Woynar et al. |
| 4,866,103 A | 9/1989 | Cassidy et al. |
| 4,960,848 A | 10/1990 | Scholl et al. |
| 4,994,541 A | 2/1991 | Dell et al. |
| 5,064,960 A | 11/1991 | Pedain et al. |
| 5,076,958 A | 12/1991 | Pedain et al. |

(Continued)

FOREIGN PATENT DOCUMENTS

| CA | 1335990    | 6/1995 |
| DE | 2414413 A1 | 10/1975 |

(Continued)

OTHER PUBLICATIONS

A. Lapprand et al., Reactivity of Isocyanates with Urethanes: Conditions for Allophanate Formation, Polymer Degradation and Stability, Bd. 90, Nr. 2, (2005) pp. 363-373.
H.J. Laas et al., The Synthesis of Aliphatic Polyisocyanates Containing Biuret, Isocyanurate or Uretdione Backbones for Use in Coating, J. Prakt., Chem., vol. 336, (1994) pp. 185-200.
Siefken, Mono- und Polyisocyanate, Justus Liebigs Annalen der Chemie, vol. 562 (1949) pp. 75-136.

*Primary Examiner* — Kuo Liang Peng
(74) *Attorney, Agent, or Firm* — Richard P. Bender; John E. Mrozinski, Jr.

(57) ABSTRACT

The invention relates to thioallophanates which contain silane groups and are of the general formula (I)

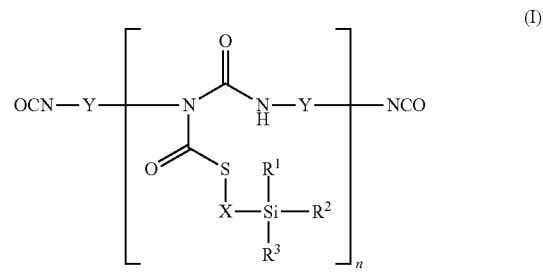

in which $R^1$, $R^2$ and $R^3$ are identical or different radicals and are each a saturated or unsaturated, linear or branched, aliphatic or cycloaliphatic radical or an optionally substituted aromatic or araliphatic radical having up to 18 carbon atoms, where said radical may optionally contain up to 3 heteroatoms from the group of oxygen, sulphur and nitrogen, X is a linear or branched organic radical having at least 2 carbon atoms, Y is a linear or branched, aliphatic or cycloaliphatic radical or an araliphatic or aromatic radical having up to 18 carbon atoms, and n is an integer from 1 to 20, to a process for preparation thereof, and to the use thereof as starting components in the production of polyurethane plastics.

14 Claims, No Drawings

(56) References Cited

U.S. PATENT DOCUMENTS

| | | | |
|---|---|---|---|
| 5,081,200 A * | 1/1992 | Yamaya | C08G 18/809 528/18 |
| 5,126,170 A | 6/1992 | Zwiener et al. | |
| 5,252,696 A | 10/1993 | Laas et al. | |
| 5,854,338 A | 12/1998 | Hovestadt et al. | |
| 5,914,383 A | 6/1999 | Richter et al. | |
| 6,022,938 A | 2/2000 | Bruchmann et al. | |
| 6,426,414 B1 | 7/2002 | Laas et al. | |
| 6,639,040 B1 | 10/2003 | Slack et al. | |
| 6,767,958 B2 | 7/2004 | Laas et al. | |
| 7,622,526 B2 | 11/2009 | Droger et al. | |
| 7,956,209 B2 | 6/2011 | Laas et al. | |
| 8,658,752 B2 | 2/2014 | Groenewolt et al. | |
| 2002/0160199 A1 | 10/2002 | Hofacker et al. | |
| 2003/0027921 A1 | 2/2003 | Speier et al. | |
| 2005/0032974 A1 | 2/2005 | Krebs et al. | |
| 2009/0018302 A1 | 1/2009 | Laas et al. | |
| 2011/0082273 A1 | 4/2011 | Laas et al. | |
| 2017/0121450 A1 | 5/2017 | Laas et al. | |

FOREIGN PATENT DOCUMENTS

| | | |
|---|---|---|
| EP | 0127364 A1 | 12/1984 |
| EP | 0422836 A2 | 4/1991 |
| EP | 0649866 A1 | 4/1995 |
| EP | 0802431 A2 | 10/1997 |
| EP | 0949284 A1 | 10/1999 |
| EP | 0994139 A1 | 4/2000 |
| EP | 1287054 A2 | 3/2003 |
| EP | 2065415 A1 | 6/2009 |
| EP | 2450386 A1 | 5/2012 |
| GB | 994890 A | 6/1965 |
| GB | 1145952 | 3/1969 |
| GB | 1244416 | 9/1971 |
| JP | 04117353 A | 4/1992 |
| JP | 04117354 A | 4/1992 |
| JP | 09071631 A | 3/1997 |
| JP | 09071632 A | 3/1997 |
| JP | 2001002674 A | 1/2001 |
| JP | 2005015644 A | 1/2005 |
| JP | 2008174520 A | 7/2008 |
| WO | 0136508 A1 | 5/2001 |
| WO | 2010148424 A1 | 12/2010 |

* cited by examiner

THIOALLOPHANATE POLYISOCYANATES CONTAINING SILANE GROUPS

CROSS REFERENCE TO RELATED APPLICATIONS

This application is a national stage application (under 35 U.S.C. § 371) of PCT/EP2015/062758, filed Jun. 9, 2015, which claims benefit of European Application No. 14172295.9, filed Jun. 13, 2014, both of which are incorporated herein by reference in their entirety.

FIELD OF THE INVENTION

The invention relates to thioallophanates containing silane groups, to a process for preparing them, and to the use thereof as a starting component in the production of polyurethane plastics, more particularly as a crosslinker component in polyurethane paints and coatings.

BACKGROUND OF THE INVENTION

Polyisocyanate mixtures containing alkoxysilane groups have been known for some considerable time. Products of this kind, which as well as the isocyanate group contain a second reactive structure, in other words a structure capable of crosslinking, have been used in the past in various polyurethane systems and polyurethane applications with the aim of obtaining specific properties, such as, for example, to improve the adhesion, chemical resistance or scratch resistance of coatings.

By way of example, WO 03/054049 describes isocyanate-functional silanes, prepared from aliphatic or cycloaliphatic polyisocyanates of low monomer content and from secondary aminopropyltrimethoxysilanes, as adhesion promoters for polyurethane hotmelt adhesives.

According to the teaching of JP-A 2005015644, as well, polyisocyanates or isocyanate prepolymers that are modified with N substituted, i.e., secondary, aminopropylalkoxysilanes can be used to improve the adhesion of adhesives and sealants.

EP-B 0 994 139 claims reaction products of aliphatic and/or cycloaliphatic polyisocyanates with substoichiometric amounts of alkoxysilane-functional aspartic esters, as described in EP 0 596 360 as coreactants for isocyanate-functional compounds, and optionally with polyethylene oxide polyether alcohols, as binders for one-component, moisture-crosslinking coatings, adhesives or sealants featuring accelerated curing.

Reaction products of aliphatic and/or cycloaliphatic polyisocyanates with substoichiometric amounts of alkoxysilane-functional aspartic esters or secondary aminoalkylsilanes are also described in WO 02/058569 as crosslinker components for two-component polyurethane adhesion primers.

EP-B 0 872 499 describes aqueous, two-component polyurethane coating materials which as a crosslinker component comprise compounds containing isocyanate groups and alkoxysilyl groups. The use of these specific polyisocyanates leads to coatings having improved water resistance in conjunction with high gloss.

Hydrophilically modified polyisocyanates containing alkoxysilane groups, which are therefore easier to emulsify, have likewise already been identified as crosslinker components for aqueous two-component coatings dispersions and adhesives dispersions (e.g. EP-A 0 949 284).

To improve the scratch resistance of solventborne thermosetting two-component automotive PU clearcoat and topcoat materials, recent times have seen proposals for reaction products of aliphatic and/or cycloaliphatic polyisocyanates with N,N-bis(trialkoxysilylpropyl)amines as a crosslinker component (EP-A 1 273 640).

WO 2009/156148 describes reaction products of isocyanate-functional compounds with substoichiometric amounts of mercaptosilanes as crosslinking gents for automotive clearcoats in OEM production-line finishing or in automotive refinishing.

Common to all of these polyisocyanate mixtures containing silane groups is that they are prepared by proportional reaction of unmodified polyisocyanates or polyisocyanate prepolymers with organofunctional silanes that contain groups reactive toward isocyanate groups, examples being mercapto-functional silanes, primary aminoalkylsilanes, secondary N-alkyl-substituted aminoalkylsilanes, or alkoxysilane-functional aspartic esters.

Such modification, however, leads inevitably to a reduction in the average isocyanate functionality relative to that of the original polyisocyanates employed, the effect of this increasing in line with the target silane content of the reaction product. In actual practice, however, the desire is actually for polyisocyanate crosslinkers with as high as possible an isocyanate functionality in the aforementioned applications, such as coating materials or adhesives, for example, in order to achieve a high network density.

Furthermore, as the degree of modification—that is, the silane group content—goes up, there is also a drastic increase in the viscosity of the products, owing to the thiourethane groups and, in particular, urea groups that are introduced into the molecule; for this reason, the silane group-containing polyisocyanates known to date can generally only be used in dissolved form, using considerable quantities of organic solvents.

An exception in this regard is represented by the polyisocyanates containing allophanate groups and silane groups that are described in EP-A 2 014 692 and EP-A 2 305 691, that are obtainable by reaction of hydroxyurethanes and/or hydroxyamides containing silane groups with excess amounts of monomeric diisocyanates; in spite of high isocyanate functionalities and high silane contents, these polyisocyanates have comparatively low viscosities. However, preparing these specific silane-functional polyisocyanates is very costly and inconvenient, and involves poor reproducibility, owing to the low stability of the hydroxyurethane and/or hydroxyamide intermediates that have formed from aminoalkylsilanes with cyclic carbonates and/or lactones, respectively.

SUMMARY OF THE INVENTION

The present invention, therefore, provides polyisocyanates containing silane groups that are not hampered by the disadvantages of the prior art. These new polyisocyanates be preparable reliably and reproducibly in a simple process and in particular have low viscosities even when their silane group contents are high.

This has been achieved with the provision of the polyisocyanates with thioallophanate structure of the invention, described in more detail below, and the process for preparing them.

DETAILED DESCRIPTION OF THE INVENTION

The present invention is based on the surprising observation that mercaptosilanes can easily be reacted with excess amounts of monomeric diisocyanates to form storage-stable thioallophanate polyisocyanates which are light in color and which, even at high degrees of conversion and high silane contents, are distinguished by exceptionally low viscosities.

The present invention provides thioallophanates containing silane groups, of the general formula (I)

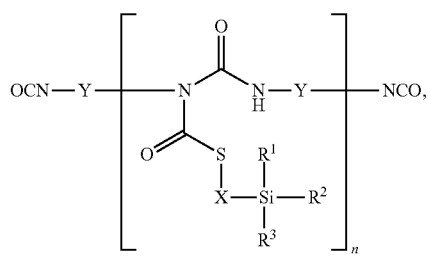

in which
R¹, R² and R³ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen,
X is a linear or branched organic radical having at least 2 carbon atoms,
Y is a linear or branched, aliphatic or cycloaliphatic, an araliphatic or aromatic radical having up to 18 carbon atoms and
n is an integer from 1 to 20.

The invention also provides a process for preparing such thioallophanates containing silane groups, by reacting
A) at least one monomeric diisocyanate of the general formula (II)

OCN—Y—NCO         (II), in which Y is a linear or branched, aliphatic or cycloaliphatic, an araliphatic or aromatic radical having up to 18 carbon atoms, with
B) mercaptosilanes of the general formula (III)

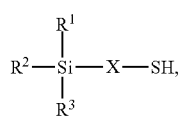
(III)

in which
R¹, R², R³ and X are as defined above,
in an equivalent ratio of isocyanate groups to mercapto groups of 2:1 to 40:1.

Also provided, lastly, is the use of the thioallophanates containing silane groups as starting components in the production of polyurethane plastics, especially as crosslinker components or constituents of crosslinker components for polyols and/or polyamines in two-component polyurethane and/or polyurea paints and coatings.

Suitable starting compounds A) for the process according to the invention are any desired diisocyanates which have aliphatically, cycloaliphatically, araliphatically and/or aromatically bonded isocyanate groups and can be prepared by any desired processes, for example by phosgenation or by a phosgene-free route, for example by urethane cleavage.

Suitable diisocyanates are, for example, those of the general formula (II)

OCN—Y—NCO         (II)

in which Y is a linear or branched, aliphatic or cycloaliphatic radical having up to 18 carbon atoms, preferably 4 to 18 carbon atoms, or an optionally substituted aromatic or araliphatic radical having up to 18 carbon atoms, preferably 6 to 18 carbon atoms, such as, for example, 1,4-diisocyanatobutane, 1,5-diisocyanatopentane, 1,6-diisocyanatohexane (HDI), 1,5-diisocyanato-2,2-dimethylpentane, 2,2,4- and 2,4,4-trimethyl-1,6-diisocyanatohexane, 1,8-diisocyanatooctane, 1,9-diisocyanatononane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanato-methylcyclohexane, 2,4'- and 4,4'-diisocyanatodicyclohexylmethane ($H_{12}$-MDI), 1,3- and 1,4-bis(isocyanatomethyl)cyclohexane, 4,4'-diisocyanato-3,3'-dimethyldicyclohexyl-methane, 4,4' diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis-(isocyanatomethyl)benzene, 1,3- and 1,4-bis(1-isocyanato-1-methylethyl)benzene (TMXDI), bis(4-(1-isocyanato-1-methylethyl)phenyl) carbonate, 1,3- and 1,4-phenylene diisocyanate, 2,4- and 2,6-tolylene diisocyanate, and any desired mixtures of these isomers, diphenylmethane 2,4'- and/or 4,4'-diisocyanate and naphthylene 1,5-diisocyanate, and any desired mixtures of such diisocyanates. Further diisocyanates which are likewise suitable are found, furthermore, for example, in Justus Liebigs Annalen der Chemie Volume 562 (1949) pp. 75-136.

Particularly preferred as starting component A) are diisocyanates of the general formula (II) in which Y is a linear or branched, aliphatic or cycloaliphatic radical having 5 to 13 carbon atoms.

Especially preferred starting components A) for the process of the invention are 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures of these diisocyanates.

Starting components B) for the process of the invention are any desired mercaptosilanes of the general formula (III)

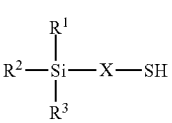
(III)

in which
R¹, R² and R³ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, and
X is a linear or branched organic radical having at least 2 carbon atoms.

Examples of suitable mercaptosilanes B) are 2-mercaptoethyltrimethylsilane, 2-mercaptoethylmethyldimethoxysilane, 2-mercaptoethyltrimethoxysilane, 2-mercaptoethyltriethoxysilane, 3-mercaptopropylmethyldimethoxysilane, 3-mercaptopropyldimethylmethoxysilane, 3-mercaptopropyltrimethoxysilane, 3-mercaptopropylmethyldiethoxysilane, 3-mercaptopropyltriethoxysilane, 3-mercaptopropylethyldimethoxysilane, 3-mercaptopropylethyldiethoxysilane and/or 4-mercaptobutyltrimethoxysilane.

Preferred mercaptosilanes B) for the process of the invention are those of the general formula (III) in which
$R^1$, $R^2$ and $R^3$ are identical or different radicals and are each a saturated, linear or branched, aliphatic or cycloaliphatic radical having up to 6 carbon atoms, and may optionally contain up to 3 oxygen atoms, and
X is a linear or branched alkylene radical having 2 to 10 carbon atoms.

Particularly preferred mercaptosilanes B) are those of the general formula (III) in which
$R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is an alkoxy radical of this kind, and
X is a propylene radical (—$CH_2$—$CH_2$—$CH_2$—).

Especially preferred mercaptosilanes B) are those of the general formula (III) in which
$R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, and
X is a propylene radical (—$CH_2$—$CH_2$—$CH_2$—).

For carrying out the process of the invention, the diisocyanates A) are reacted with the mercaptosilanes B) at temperatures of 20 to 200° C., preferably 40 to 160° C., while observing an equivalent ratio of isocyanate groups to mercapto groups of 2:1 to 40:1, preferably of 4:1 to 30:1, particularly preferably 6:1 to 20:1, to give thioallophanates.

The process of the invention can be carried out without catalysis, as a thermally induced allophanatization. Preferably, however, suitable catalysts are used for accelerating the allophanatization reaction. These are the customary, known allophanatization catalysts, examples being metal carboxylates, metal chelates or tertiary amines of the type described in GB-A-0 994 890, alkylating agents of the type described in U.S. Pat. No. 3,769,318, or strong acids, as described for example in EP-A-0 000 194.

Suitable allophanatization catalysts are, in particular, zinc compounds, such as, for example, zinc(II) stearate, zinc(II) n-octanoate, zinc(II) 2-ethyl-1-hexanoate, zinc(II) naphthenate or zinc(II) acetylacetonate, tin compounds, such as, for example, tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, zirconium compounds, such as, for example, zirconium(IV) 2-ethyl-1-hexanoate, zirconium (IV) neodecanoate, zirconium(IV) naphthenate or zirconium (IV) acetylacetonate, aluminum tri(ethylacetoacetate), iron (III) chloride, potassium octoate, manganese compounds, cobalt compounds or nickel compounds, and also strong acids, such as, for example, trifluoroacetic acid, sulfuric acid, hydrogen chloride, hydrogen bromide, phosphoric acid or perchloric acid, or any desired mixtures of these catalysts.

Catalysts which are suitable, albeit less preferred, for the process of the invention are also compounds which as well as the allophanatization reaction also catalyze the trimerization of isocyanate groups to form isocyanurate structures. Such catalysts are described for example in EP-A-0 649 866 page 4, line 7 to page 5, line 15.

Preferred catalysts for the process of the invention are zinc compounds and/or zirconium compounds of the above-stated type. Especially preferred is the use of zinc(II) n-octanoate, zinc(II) 2-ethyl-1-hexanoate and/or zinc(II) stearate, zirconium(IV) n-octanoate, zirconium(IV) 2-ethyl-1-hexanoate and/or zirconium(IV) neodecanoate.

These catalysts are employed in the process of the invention, if at all, in an amount of 0.001 to 5 wt %, preferably 0.005 to 1 wt %, based on the total weight of the coreactants A) and B), and may be added both before the beginning of the reaction and at any point in time during the reaction.

The process of the invention is preferably carried out solventlessly. If desired, however, suitable solvents inert toward the reactive groups of the starting components can also be used. Examples of suitable solvents are the customary paint solvents which are known per se, such as, for example, ethyl acetate, butyl acetate, ethylene glycol monomethyl or monoethyl ether acetate, 1-methoxy-2-propyl acetate, 3-methoxy-n-butyl acetate, acetone, 2-butanone, 4-methyl-2-pentanone, cyclohexanone, toluene, xylene, chlorobenzene, white spirit, relatively highly substituted aromatics, of the kind commercialized, for example, under the names solvent naphtha, Solvesso®, Isopar®, Nappar® (Deutsche EXXON CHEMICAL GmbH, Cologne, DE) and Shellsol® (Deutsche Shell Chemie GmbH, Eschborn, DE), but also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

In one possible embodiment, in the process of the invention, the starting diisocyanate A) or a mixture of different starting diisocyanates is introduced optionally under inert gas, such as nitrogen, for example, and optionally in the presence of a suitable solvent of the stated type, at a temperature between 20 and 100° C. Subsequently the mercaptosilane B) or a mixture of different mercaptosilanes in the quantity indicated above is added and the reaction temperature for the thiourethanization is set, optionally by means of an appropriate measure (heating or cooling), to a temperature of 30 to 120° C., preferably of 50 to 100° C. Following the thiourethanization reaction, i.e., when the NCO content reached is that corresponding theoretically to complete conversion of isocyanate groups and mercapto groups, the thioallophanatization may be started, for example, without addition of a catalyst, by heating of the reaction mixture to a temperature of 120 to 200° C. Preferably, however, suitable catalysts of the above-stated kind are employed in order to accelerate the thioallophanatization reaction, in which case, depending on the nature and amount of the catalyst used, temperatures in the range from 60 to 140° C., preferably 70 to 120° C., are sufficient for implementing the reaction.

In another possible embodiment of the process of the invention, the catalyst for optional accompanying use is admixed either to the diisocyanate component A) and/or to the silane component B) before the beginning of the actual reaction. In this case the thiourethane groups formed as intermediates undergo spontaneous further reaction to give the desired thioallophanate structure. With this kind of single-stage reaction regime, the starting diisocyanates A) optionally comprising the catalyst are introduced, optionally under inert gas, such as nitrogen, for example, and optionally in the presence of a suitable solvent of the type stated, generally at temperatures which are optimum for the thioallophanatization, in the range from 60 to 140° C., preferably 70 to 120° C., and are reacted with the silane component B) optionally comprising the catalyst.

An alternative option is to add the catalyst to the reaction mixture at any desired point in time during the thiourethanization reaction. In the case of this embodiment of the process of the invention, for the pure thiourethanization reaction which proceeds before the addition of catalyst, in general a temperature in the range from 30 to 120° C., preferably from 50 to 100° C., is set. Following addition of a suitable catalyst, finally, the thioallophanatization reaction is carried out at temperatures of 60 to 140° C., preferably of 70 to 120° C.

The progress of the reaction in the process according to the invention can be monitored by determining the NCO content by titrimetric means, for example. When the target NCO content has been reached, preferably when the degree of thioallophanatization (that is, the percentage fraction, calculable from the NCO content, of the thiourethane groups which have undergone reaction to form thioallophanate groups and which form as intermediates from the mercapto groups of component B)) of the reaction mixture is at least 70%, more preferably at least 90%, and very preferably after complete thioallophanatization, the reaction is discontinued. In the case of a purely thermal reaction regime, this may be accomplished, for example, by cooling the reaction mixture to room temperature. In the case of the preferred accompanying use of a thioallophanatization catalyst of the type stated, however, the reaction is generally stopped by addition of suitable catalyst poisons, examples being acyl chlorides, such as benzoyl chloride or isophthaloyl dichloride.

The reaction mixture is preferably then freed by thin-film distillation under a high vacuum, as for example at a pressure below 1.0 mbar, preferably below 0.5 mbar, more preferably below 0.2 mbar, under very gentle conditions, as for example at a temperature of 100 to 200° C., preferably of 120 to 180° C., from volatile constituents (excess monomeric diisocyanates, solvents optionally used, and, when no catalyst poison is being used, any active catalyst).

The distillates obtained, which as well as the unreacted monomeric starting diisocyanates, comprise any solvents used, where no catalyst poison is used, any active catalyst, can be used readily for renewed oligomerization.

In another embodiment of the process of the invention, the stated volatile constituents are removed from the oligomerization product by extraction with suitable solvents that are inert toward isocyanate groups, examples being aliphatic or cycloaliphatic hydrocarbons such as pentane, hexane, heptane, cyclopentane or cyclohexane.

Irrespective of the nature of the working up, the products obtained from the process of the invention are clear, virtually colorless thioallophanate polyisocyanates, with color numbers generally of less than 120 APHA, preferably less than 80 APHA, more preferably less than 60 APHA, and with an NCO content of 2.0 to 18.0 wt %, preferably 7.0 to 17.0 wt %, more preferably 10.0 to 16.0 wt %. The average NCO functionality, depending on the degree of conversion and thioallophanatization catalyst used, is generally from 1.8 to 3.0, preferably from 1.8 to 2.5, more preferably from 1.9 to 2.0.

The thioallophanate polyisocyanates of the invention represent valuable starting materials for the production of polyurethane plastics and/or polyurea plastics by the isocyanate polyaddition process.

On the basis of their low viscosity, they can be used without solvent, but as and when required may also be converted to a haze-free dilution form using customary solvents, examples being the aforementioned inert paint solvents for optional accompanying use in the process of the invention.

The thioallophanate polyisocyanates of the invention containing silane groups are outstandingly suitable as crosslinker components or constituents of crosslinker components for two-component polyurethane coating materials, in which polyhydroxyl compounds present are the customary polyether polyols, polyester polyols, polycarbonate polyols and/or polyacrylate polyols, as coreactants for the polyisocyanates. Particularly preferred coreactants for the process products of the invention are polyacrylates containing hydroxyl groups, i.e., polymers and/or copolymers of (meth) acrylic acid alkyl esters, optionally with styrene or other copolymerizable olefinically unsaturated monomers.

In general the coating compositions formulated with the thioallophanate polyisocyanates of the invention containing silane groups, into which compositions, optionally, the auxiliaries and additives customary in the coatings sector may be incorporated, examples being flow control assistants, color pigments, fillers or matting agents, have technical coatings properties that are good even in the case of room-temperature drying. Of course, they may alternatively be dried under forced conditions at elevated temperature or by baking at temperatures up to 260° C.

In order to control the rate of cure, it is possible when formulating the coating compositions to include suitable catalysts, examples being the catalysts customary in isocyanate chemistry, such as, for example, tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc 2-ethylcaproate, tin(II) octanoate, tin(II) ethylcaproate, dibutyltin(IV) dilaurate, bismuth(III) 2-ethylhexanoate, bismuth(III) octoate, or molybdenum glycolate. In addition it is also possible to use catalysts which accelerate the hydrolysis and condensation of alkoxysilane groups or their reaction with the hydroxyl groups of the polyol components used as binders. Catalysts of this kind, as well as aforementioned isocyanate catalysts, are also, for example, acids, such as p-toluenesulfonic acid, trifluoromethanesulfonic acid, acetic acid, trifluoracetic acid, and dibutyl phosphate, bases, such as N-substituted amidines such as 1,5-diazabicyclo[4.3.0]non-5-ene (DBN) and 1,5-diazabicyclo[5.4.0]undec-7-ene (DBU), but also metal salts or organometallic compounds, such as tetraisopropyl titanate, tetrabutyl titanate, titanium(IV) acetylacetonate, aluminum acetylacetonate, aluminum triflate or tin triflate, for example.

The thioallophanate polyisocyanates of the invention containing silane groups can of course also be used in a form in which they are blocked with blocking agents known per se from polyurethane chemistry, in combination with the aforementioned film-forming binders or film-forming binder components, as one-component PU baking systems. Examples of suitable blocking agents are diethyl malonate, ethyl acetoacetate, activated cyclic ketones, such as cyclopentanone-2-carboxymethyl ester and -carboxyethyl ester, for example, acetone oxime, butanone oxime, ε caprolactam, 3,5-dimethylpyrazole, 1,2,4-triazole, dimethyl-1,2,4-triazole, imidazole, benzyl-tert-butylamine, or any desired mixtures of these blocking agents.

The process products of the invention can also be combined with polyamines, such as the polyaspartic acid derivatives known from EP-B 0 403 921, or else with polyamines whose amino groups are in blocked form, such as polyketimines, polyaldimines or oxazolanes, for example. The effect of moisture on these blocked amino groups is to turn them into free amino groups and, in the case of the oxazolanes, into free hydroxyl groups as well, which are consumed by reaction with the isocyanate groups of the thioallophanate polyisocyanates containing silane groups—a reaction accompanied by crosslinking.

The thioallophanate polyisocyanates of the invention containing silane groups are also suitable as crosslinker components for binders or binder components which are present in aqueous solution or dispersion and have groups that are reactive toward isocyanate groups, more particularly alcoholic hydroxyl groups, in the production of aqueous two-component polyurethane systems. In this case, on the basis of their low viscosity, they can be used either as such, i.e., in hydrophobic form, or else in a form in which they have been given hydrophilic modification by known methods, as for example in accordance with EP-B 0 540 985, EP-B 0 959 087 or EP-B 1 287 052.

The coating systems formulated with the thioallophanate polyisocyanates of the invention containing silane groups may optionally also be admixed with any desired further hydrolyzable silane compounds, such as, for example, tetramethoxysilane, tetraethoxysilane, methyltrimethoxysilane, methyltriethoxysilane, ethyltriethoxysilane, isobutyltrimethoxysilane, isobutyltriethoxysilane, octyltriethoxysilane, octyltrimethoxysilane, (3 glycidyl-oxypropyl) methyldiethoxysilane, (3-glycidyloxypropyl) trimethoxysilane, phenyl-trimethoxysilane or phenyltriethoxysilane, or mixtures of such silane compounds, as coreactants.

In all of the uses described above for the thioallophanate polyisocyanates of the invention, they may be employed both alone and in blends with any desired further polyisocyanates having aliphatically, cycloaliphatically, araliphatically and/or aromatically bonded isocyanate groups, more particularly with the known paint polyisocyanates having uretdione, isocyanurate, iminooxadiazinedione, urethane, allophanate, biuret and/or oxadiazinetrione structure, as described by way of example in Laas et al., *J. Prakt. Chem.* 336, 1994, 185-200, in DE-A 1 670 666, DE-A 3 700 209, DE-A 3 900 053, EP-A 0 330 966, EP-A 0 336 205, EP-A 0 339 396, and EP-A 0 798 299, as isocyanate component. Those blends in particular in which the thioallophanates of the invention, by virtue of their very low viscosity, take on the part of a reactive diluent for paint polyisocyanates, which in general are of higher viscosity, exhibit the advantage of considerably higher isocyanate contents and isocyanate functionalities than the prior-art, silane-functional polyisocyanates with comparable silane contents known to date, in conjunction with much lower viscosities.

The invention accordingly also provides for the use of the thioallophanate polyisocyanates of the invention containing silane groups for blending with polyisocyanates having aliphatically, cycloaliphatically, araliphatically and/or aromatically bonded isocyanate groups which have uretdione, isocyanurate, iminooxadiazinedione, urethane, allophanate, biuret and/or oxadiazinetrione structure, and also the polyisocyanates mixtures resulting therefrom and containing silane groups, themselves.

In two-component polyurethane and/or polyurea paints and coatings which comprise the thioallophanate polyisocyanates of the invention as crosslinker components or constituents of crosslinker components for polyols and/or polyamines, the coreactants are customarily present in amounts such that for every optionally blocked isocyanate group there are 0.5 to 3, preferably 0.6 to 2.0, more preferably 0.8 to 1.6 optionally blocked, isocyanate-reactive groups.

The polyisocyanate mixtures of the invention may optionally be admixed in minor amounts, however, with nonfunctional film-forming binders, for the purpose of achieving very specific properties, as an additive for improving adhesion, for example.

Substrates contemplated for the coatings formulated using the thioallophanate polyisocyanates of the invention containing silane groups include any desired substrates, such as, for example, metal, wood, glass, stone, ceramic materials, concrete, rigid and flexible plastics, textiles, leather, and paper, which prior to coating may optionally also be provided with customary primers.

Further provided by this invention, therefore, are coating compositions comprising the thioallophanate polyisocyanates of the invention containing silane groups, and also the substrates coated with these coating compositions.

EXAMPLES

All percentages are based on weight, unless stated otherwise.

The NCO contents were determined by titrimetry as per DIN EN ISO 11909.

The residual monomer contents were measured to DIN EN ISO 10283 by gas chromatography with an internal standard.

All the viscosity measurements were made with a Physica MCR 51 rheometer from Anton Paar Germany GmbH (DE) to DIN EN ISO 3219.

The Hazen color numbers were examined on a LICO 400 colorimeter from Hach Lange GmbH, Düsseldorf.

The amounts (mol %) of the thiourethane, thioallophanate, and isocyanurate isocyanate derivatives formed under the process conditions of the invention were computed from the integrals of proton-decoupled $^{13}$C-NMR spectra (recorded on a Bruker DPX-400 instrument), and are based in each case on the sum of thiourethane, thioallophanate, and isocyanurate groups present. The individual structural elements have the following chemical shifts (in ppm): thiourethane: 166.8; thioallophanate: 172.3 and 152.8; isocyanurate: 148.4.

Example 1 (Inventive)

1008 g (6 mol) of hexamethylene diisocyanate (HDI) were introduced under dry nitrogen with stirring at a temperature of 80° C. and 196 g (1.0 mol) of mercaptopropyltrimethoxysilane were added over the course of 30 minutes. The reaction mixture was stirred further at 80° C. until, after about 6 hours, the NCO content of 38.4%, corresponding to complete thiourethanization, had been reached.

At this point in time, a sample was taken from the reaction mixture, and its composition determined by $^{13}$C-NMR spectroscopy. According to this determination, thiourethane groups were present exclusively. The $^{13}$C-NMR spectrum showed no signals of thioallophanate groups or isocyanurate groups.

Addition of 0.1 g of zinc(II) 2-ethyl-1-hexanoate as catalyst to the reaction mixture, which was at a temperature of 80° C., initiated the thioallophanatization reaction, the temperature rising to up to 85° C. because of the exothermic reaction. Stirring continued at 85° C. until, about an hour after addition of the catalyst, the NCO content had dropped to 34.9%. The reaction was stopped by addition of 0.1 g of orthophosphoric acid and the unreacted monomeric HDI was removed in a thin-film evaporator at a temperature of 130° C. and a pressure of 0.1 mbar. This gave 538 g of a virtually colorless, clear polyisocyanate mixture whose characteristics and compositions were as follows:
NCO content: 14.4%
Monomeric HDI: 0.08%
Viscosity (23° C.): 291 mPas
Thiourethane: 0.0 mol %
Thioallophanate: 91.2 mol %
Isocyanurate groups: 8.8 mol %

Example 2 (Inventive)

1008 g (6 mol) of hexamethylene diisocyanate (HDI) were introduced under dry nitrogen with stirring at a temperature of 80° C. and 0.1 g of zinc(II) 2-ethyl-1-hexanoate as catalyst were added. Over a period of about 30 minutes, 196 g (1.0 mol) of mercaptopropyltrimethoxysilane were added dropwise, with the temperature of the mixture rising to up to 85° C. owing to the exothermic reaction. The reaction mixture was stirred further at 85° C. until, after about 2 hours, the NCO content had dropped to 34.9%. The catalyst was deactivated by addition of 0.1 g of orthophosphoric acid and the unreacted monomeric HDI was removed in a thin-film evaporator at a temperature of 130° C. and a pressure of 0.1 mbar. This gave 523 g of a virtually colorless, clear polyisocyanate mixture whose characteristics and composition were as follows:
NCO content: 14.2%
Monomeric HDI: 0.05%
Viscosity (23° C.): 249 mPas
Thiourethane: 0.0 mol %
Thioallophanate: 98.5 mol %
Isocyanurate groups: 1.5 mol %

Example 3 (Inventive)

By the process described in example 2, 1344 g (8 mol) of HDI were reacted with 196 g (1.0 mol) of mercaptopropyltrimethoxysilane in the presence of 0.15 g of zinc(II) 2-ethyl-1-hexanoate at a temperature of 85° C. to an NCO content of 38.2%. After the reaction had been stopped with 0.15 g of orthophosphoric acid and the reaction mixture had been worked up by distillation in a thin-film evaporator, 528 g were obtained of a virtually colorless, clear polyisocyanate mixture, whose characteristics and composition were as follows:
NCO content: 15.2%
Monomeric HDI: 0.12%
Viscosity (23° C.): 209 mPas
Thiourethane: 0.0 mol %
Thioallophanate: 99.0 mol %
Isocyanurate groups: 1.0 mol %

Example 4 (Inventive)

By the process described in example 2, 672 g (4 mol) of HDI were reacted with 196 g (1.0 mol) of mercaptopropyltrimethoxysilane in the presence of 0.1 g of zinc(II) 2-ethyl-1-hexanoate at a temperature of 85° C. to an NCO content of 29.0%. After the reaction had been stopped with 0.1 g of orthophosphoric acid and the reaction mixture had been worked up by distillation in a thin-film evaporator, 486 g were obtained of a virtually colorless, clear polyisocyanate mixture, whose characteristics and composition were as follows:
NCO content: 12.9%
Monomeric HDI: 0.06%
Viscosity (23° C.): 298 mPas
Thiourethane: 0.0 mol %
Thioallophanate: 98.3 mol %
Isocyanurate groups: 1.7 mol %

Example 5 (Inventive)

By the process described in example 2, 756 g (4.5 mol) of HDI were reacted with 294 g (1.5 mol) of mercaptopropyltrimethoxysilane in the presence of 0.1 g of zinc(II) 2-ethyl-1-hexanoate at a temperature of 85° C. to an NCO content of 24.0%. After the reaction had been stopped with 0.1 g of orthophosphoric acid and the reaction mixture had been worked up by distillation in a thin-film evaporator, 693 g were obtained of a virtually colorless, clear polyisocyanate mixture, whose characteristics and composition were as follows:
NCO content: 11.8%
Monomeric HDI: 0.06%
Viscosity (23° C.): 452 mPas
Thiourethane: 0.0 mol %
Thioallophanate: 99.0 mol %
Isocyanurate groups: 1.0 mol %

Example 6 (Inventive)

By the process described in example 2, 756 g (4.5 mol) of HDI were reacted with 357 g (1.5 mol) of mercaptopropyltriethoxysilane in the presence of 0.1 g of zinc(II) 2-ethyl-1-hexanoate at a temperature of 85° C. to an NCO content of 22.6%. After the reaction had been stopped with 0.1 g of orthophosphoric acid and the reaction mixture had been worked up by distillation in a thin-film evaporator, 715 g were obtained of a virtually colorless, clear polyisocyanate mixture, whose characteristics and composition were as follows:
NCO content: 11.3%
Monomeric HDI: 0.21%
Viscosity (23° C.): 267 mPas
Thiourethane: 0.0 mol %
Thioallophanate: 98.4 mol %
Isocyanurate groups: 1.6 mol %

Example 7 (Inventive)

504 g (3.0 mol) of HDI were introduced under dry nitrogen with stirring at a temperature of 80° C. and 588 g (3.0 mol) of mercaptopropyltrimethoxysilane were added over the course of 30 minutes. The reaction mixture was stirred further at 80° C. until, after about 12 hours, the NCO content of 11.5%, corresponding to complete thiourethanization, had been reached. 0.1 g of zinc(II) 2-ethyl-1-hexanoate was added as catalyst to the reaction mixture, which was at 80° C., whereupon the temperature rose to up to 85° C. owing to the exothermic thioallophanatization reaction. The mixture was stirred further at 85° C. until, about 4 hours after addition of catalyst, the NCO content had dropped to 3.0%. The reaction was then stopped by addition of 0.1 g of orthophosphoric acid. This gave a virtually colorless, clear polyisocyanate mixture, whose characteristics and composition were as follows:
NCO content: 3.0%
Monomeric HDI: 0.69%
Viscosity (23° C.): 9,220 mPas
Thiourethane: 23.2 mol %

Thioallophanate: 66.6 mol %
Isocyanurate groups: 10.2 mol %

Example 8 (Inventive)

1332 g (6 mol) of isophorone diisocyanate (IPDI) were introduced under dry nitrogen with stirring at a temperature of 95° C. and 0.2 g of zinc(II) 2-ethyl-1-hexanoate as catalyst was added. Over a period of about 30 minutes, 196 g (1.0 mol) of mercaptopropyltrimethoxysilane were added dropwise, with the temperature of the mixture rising to up to 103° C. owing to the exothermic reaction. The reaction mixture was stirred further at 100° C. until, after about 5 hours, the NCO content had dropped to 27.4%. The catalyst was deactivated by addition of 0.2 g of orthophosphoric acid, and the unreacted monomeric IPDI was removed in a thin-film evaporator at a temperature of 160° C. and a pressure of 0.1 mbar. This gave 659 g of a clear, pale yellow polyisocyanate mixture, whose characteristics and composition were as follows:
NCO content: 11.6%
Monomeric IPDI: 0.46%
Viscosity (23° C.): 11 885 mPas
Thiourethane: 1.3 mol %
Thioallophanate: 93.4 mol %
Isocyanurate groups: 4.3 mol %

Example 9 (Inventive, Thermal Thioallophanatization)

Added dropwise to 756 g (4.5 mol) of HDI, under dry nitrogen and with stirring at a temperature of 80° C., were 294 g (1.5 mol) of mercaptopropyltrimethoxysilane, over a period of approximately 30 minutes. The reaction mixture was subsequently heated to 140° C. and stirred further until after about 5 hours the NCO content had dropped to 24.0%. Working up by distillation in a thin-film evaporator gave 685 g of a virtually colorless, clear polyisocyanate mixture, whose characteristics and composition were as follows:
NCO content: 11.8%
Monomeric HDI: 0.08%
Viscosity (23° C.): 447 mPas
Thiourethane: 0.0 mol %
Thioallophanate: 98.6 mol %
Isocyanurate groups: 1.4 mol %

Examples 10-13 (Inventive) and 14 (Comparative)

80 parts by weight of a polyisocyanurate polyisocyanate A) based on HDI, with an NCO content of 21.6%, an average isocyanate functionality of 3.5, and a viscosity (23° C.) of 3200 mPas, were admixed with 20 parts by weight of the thioallophanate polyisocyanate from example 5 and homogenized by stirring at 60° C. for 30 minutes to form a silane-functional polyisocyanate mixture 10 of the invention.

Using the same method, and employing the amounts of the same starting components as listed in table 1 below, the inventive silane-functional polyisocyanate mixtures 11 to 13 were produced.

For comparison, based on example 1 of WO 2009/156148, by solvent-free reaction of 79 parts by weight of the above-described polyisocyanurate polyisocyanate A) based on HDI (NCO content: 21.6%; average NCO functionality: 3.5; viscosity (23° C.): 3200 mPas) with 21 parts by weight of mercaptopropyltrimethoxysilane in the presence of 500 ppm of dibutyltin dilaurate as catalyst, a partially silanized HDI trimer (comparative example 14) was prepared.

Table 1 below shows compositions (parts by weight) and characteristic data for the silane-functional polyisocyanate mixtures 10 to 13 of the invention, and also the characteristic data for comparative polyisocyanate 14 according to WO 2009/156148.

TABLE 1

|  | Example | | | | |
| --- | --- | --- | --- | --- | --- |
|  | 10 | 11 | 12 | 13 | 14 (Comparative) |
| HDI polyisocyanurate | 80 | 70 | 60 | 50 | — |
| Polyisocyanate from example 5 | 20 | 30 | 40 | 50 | — |
| NCO content [%] | 19.6 | 18.7 | 17.6 | 16.7 | 12.6 |
| Viscosity (23° C.) [mPas] | 2240 | 1820 | 1490 | 1210 | 11 800 |
| average NCO functionality | 3.2 | 3.1 | 2.9 | 2.8 | 2.6 |

A direct comparison of the inventive silane-functional polyisocyanates mixture 13 with the comparative polyisocyanate 14 of WO 2009/156148, both having a silane group content (calculated as —Si(OCH$_3$)$_3$; mol. weight=121 g/mol) of 13%, impressively demonstrates the clear advantage of the inventive process products in terms of isocyanate content, isocyanate functionality, and viscosity, relative to the existing state of the art.

Various aspects of the subject matter described herein are set out in the following numbered clauses:
1. Thioallophanates containing silane groups, of the general formula (I)

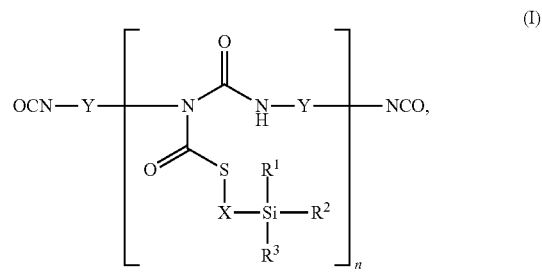

in which
R$^1$, R$^2$ and R$^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen,
X is a linear or branched organic radical having at least 2 carbon atoms,
Y is a linear or branched, aliphatic or cycloaliphatic, an araliphatic or aromatic radical having up to 18 carbon atoms, and
n is an integer from 1 to 20.
2. The thioallophanates containing silane groups as in clause 1, characterized in that in formula (I)
R$^1$, R$^2$ and R$^3$ are identical or different radicals and are each a saturated, linear or branched, aliphatic or cycloaliphatic radical having up to 6 carbon atoms, and may optionally contain up to 3 oxygen atoms, and X is a linear or branched alkylene radical having 2 to 10 carbon atoms, and Y and n have the definition stated in claim 1.

3. The thioallophanates containing silane groups as in clause 1, characterized in that in formula (I)

$R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is an alkoxy radical of this kind, and X is a propylene radical (—CH$_2$—CH$_2$—CH$_2$—), Y and n have the definition stated in claim 1.

4. The thioallophanates containing silane groups as in clause 1, characterized in that in formula (I)

$R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, X is a propylene radical (—CH$_2$—CH$_2$—CH$_2$—), and Y and n have the definition stated in claim 1.

5. The thioallophanates containing silane groups as in any of clauses 1 to 4, characterized in that in formula (I)

Y is a linear or branched, aliphatic or cycloaliphatic radical having 5 to 13 carbon atoms.

6. The thioallophanates containing silane groups as in any of clauses 1 to 4, characterized in that in formula (I)

Y is an aliphatic and/or cycloaliphatic radical as obtained by removing the isocyanate groups from a diisocyanate selected from the series of 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane.

7. A process for preparing thioallophanates containing silane groups as in clause 1, by reacting A) at least one monomeric diisocyanate of the general formula (II)

OCN—Y—NCO    (II), in which Y is a linear or branched, aliphatic or cycloaliphatic, an araliphatic or aromatic radical having up to 18 carbon atoms, with B) mercaptosilanes of the general formula (III)

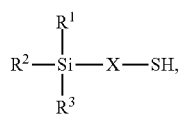

(III)

in which $R^1$, $R^2$, $R^3$ and X have the definition stated in claim 1 in an equivalent ratio of isocyanate groups to mercapto groups of 2:1 to 40:1.

8. The process as in clause 7, characterized in that diisocyanates of the general formula (II) in which Y is a linear or branched, aliphatic or cycloaliphatic radical having 5 to 13 carbon atoms are employed as component A).

9. The process as in clause 7, characterized in that 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures of these diisocyanates are employed as component A).

10. The process as in any of clauses 7 to 9, characterized in that mercaptosilanes of the general formula (III) are employed as component B)

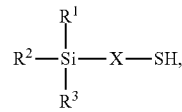

(III)

in which $R^1$, $R^2$ and $R^3$ are identical or different radicals and are each a saturated, linear or branched, aliphatic or cycloaliphatic radical having up to 6 carbon atoms, and may optionally contain up to 3 oxygen atoms, and X is a linear or branched alkylene radical having 2 to 10 carbon atoms, or any desired mixtures of such mercaptosilanes.

11. The process as in any of clauses 7 to 9, characterized in that mercaptosilanes of the general formula (III) are employed as component B)

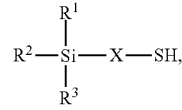

(III)

in which $R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is an alkoxy radical of this kind, and X is a propylene radical (—CH$_2$—CH$_2$—CH$_2$—), or any desired mixtures of such mercaptosilanes.

12. The process as in any of clauses 7 to 9, characterized in that mercaptosilanes of the general formula (III) are employed as component B)

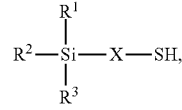

(III)

in which $R^1$, $R^2$ and $R^3$ are identical or different radicals and are each methyl, methoxy or ethoxy, with the proviso that at least one of the radicals R1, R2 and R3 is a methoxy or ethoxy radical, and X is a propylene radical (—CH$_2$—CH$_2$—CH$_2$—), or any desired mixtures of such mercaptosilanes.

13. The process as in any of clauses 7 to 12, characterized in that the reaction is carried out in the presence of a catalyst which accelerates the formation of thioallophanate groups, preferably in the presence of zinc carboxylates and/or zirconium carboxylates.

14. The use of the thioallophanates containing silane groups as in any of clauses 1 to 6 as starting components in the production of polyurethane plastics.

15. Coating compositions comprising thioallophanates containing silane groups as in any of clauses 1 to 6.

16. Substrates coated with coating compositions as in clause 15.

The invention claimed is:

1. A polyurethane plastic reaction product from a thioallophanate comprising silane groups, of the formula (I)

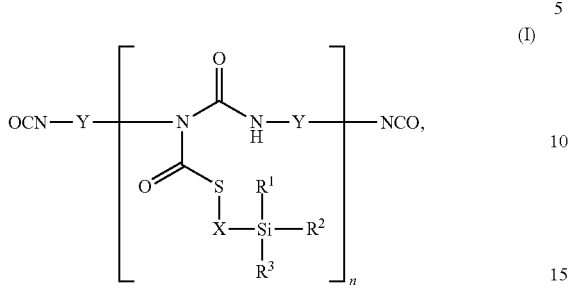

wherein,
$R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen,
X is a linear or branched organic radical having at least 2 carbon atoms,
Y is a linear or branched, aliphatic or cycloaliphatic, an araliphatic or aromatic radical having up to 18 carbon atoms, and
n is an integer from 1 to 20.

2. The polyurethane plastic reaction product from a thioallophanate according to claim 1, wherein in formula (I),
$R^1$, $R^2$ and $R^3$ are identical or different radicals and are each a saturated, linear or branched, aliphatic or cycloaliphatic radical having up to 6 carbon atoms, and may optionally contain up to 3 oxygen atoms, and
X is a linear or branched alkylene radical having 2 to 10 carbon atoms.

3. The polyurethane plastic reaction product from a thioallophanate according to claim 1, wherein in formula (I),
$R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is an alkoxy radical, and
X is a propylene radical (—$CH_2$—$CH_2$—$CH_2$—).

4. The polyurethane plastic reaction product from a thioallophanate ophanate according to claim 1, wherein in formula (I),
$R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, and
X is a propylene radical (—$CH_2$—$CH_2$—$CH_2$—).

5. The polyurethane plastic reaction product from a thioallophanate ophanate according to claim 1, wherein in formula (I),
Y is a linear or branched, aliphatic or cycloaliphatic radical having 5 to 13 carbon atoms.

6. The polyurethane plastic reaction product from a thioallophanate ophanate according to claim 1, wherein in formula (I),
Y is an aliphatic and/or cycloaliphatic radical obtained by removing the isocyanate groups from a diisocyanate selected from the group consisting of 1,5-diisocyanatopentane, 1,6-diisocyanatohexane, 1-isocyanato-3,3,5-trimethyl-5-isocyanatomethylcyclohexane, 2,4'- and 4,4'-diisocyanatodicyclohexylmethane.

7. A process for preparing a thioallophanate by reacting
A) at least one monomeric diisocyanate of the formula (II)

in which Y is a linear or branched, aliphatic or cycloaliphatic, an araliphatic or aromatic radical having up to 18 carbon atoms, with
B) a mercaptosilane of the formula (III)

wherein,
$R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen,
X is a linear or branched organic radical having at least 2 carbon atoms,
Y is a linear or branched, aliphatic or cycloaliphatic, an araliphatic or aromatic radical having up to 18 carbon atoms, and
n is an integer from 1 to 20,
in an equivalent ratio of isocyanate groups to mercapto groups of 2:1 to 40:1,
wherein the reaction is carried out in the presence of a catalyst selected from the group consisting of zinc carboxylates and zirconium carboxylates.

8. The process according to claim 7, wherein component A) comprises the diisocyanate of the formula (II) in which Y is a linear or branched, aliphatic or cycloaliphatic radical having 5 to 13 carbon atoms.

9. The process according to claim 7, wherein component A) is selected from the group consisting of 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures thereof.

10. The process according to claim 7, wherein component B) comprises the mercaptosilane of the formula (III)

wherein
$R^1$, $R^2$ and $R^3$ are identical or different radicals and are each a saturated, linear or branched, aliphatic or cycloaliphatic radical having up to 6 carbon atoms, and may optionally contain up to 3 oxygen atoms, and
X is a linear or branched alkylene radical having 2 to 10 carbon atoms,
or any desired mixtures thereof.

11. The process according to claim 7, wherein component B) comprises the mercaptosilane of the formula (III)

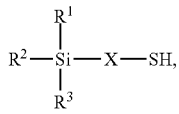
(III)

wherein
$R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is an alkoxy radical, and
X is a propylene radical (—$CH_2$—$CH_2$—$CH_2$—),
or any desired mixtures thereof.

12. The process according to claim 7, wherein component B) comprises the mercaptosilane of the formula (III)

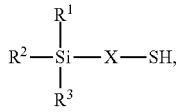
(III)

wherein
$R^1$, $R^2$ and $R^3$ are identical or different radicals and are each methyl, methoxy or ethoxy, with the proviso that at least one of the radicals R1, R2 and R3 is a methoxy or ethoxy radical, and
X is a propylene radical (—$CH_2$—$CH_2$—$CH_2$—),
or any desired mixtures of such mercaptosilanes.

13. A polyurethane or polyurea paint or coating composition comprising a reaction product from thioallophanate comprising silane groups, of the formula (I)

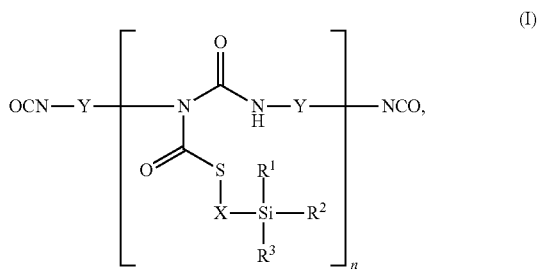
(I)

wherein,
$R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen,
X is a linear or branched organic radical having at least 2 carbon atoms,
Y is a linear or branched, aliphatic or cycloaliphatic, an araliphatic or aromatic radical having up to 18 carbon atoms, and
n is an integer from 1 to 20.

14. A substrate coated with the polyurethane or polyurea paint or coating composition according to claim 13.

* * * * *